United States Patent
Teeley et al.

(10) Patent No.: US 7,947,126 B2
(45) Date of Patent: May 24, 2011

(54) PROCESSES FOR PREPARING ORGANIC PIGMENT DISPERSIONS AND INK

(75) Inventors: Christopher M. Teeley, Louisville, KY (US); David Kassin, Warren, MI (US); Douglas L. Cochran, Elizabethtown, KY (US); Christopher B. Palmer, Gregory, KY (US); Norman E. Pratt, Northville, MI (US)

(73) Assignee: Flint Group Incorporated, Plymouth, MI (US)

( * ) Notice: Subject to any disclaimer, the term of this patent is extended or adjusted under 35 U.S.C. 154(b) by 768 days.

(21) Appl. No.: 11/204,083

(22) Filed: Aug. 15, 2005

(65) Prior Publication Data
US 2006/0037517 A1 Feb. 23, 2006

Related U.S. Application Data

(60) Provisional application No. 60/602,285, filed on Aug. 17, 2004.

(51) Int. Cl.
- *C08K 5/00* (2006.01)
- *C09D 11/00* (2006.01)
- *C09D 11/06* (2006.01)
- *C11C 3/00* (2006.01)
- *B01F 13/00* (2006.01)

(52) U.S. Cl. ....... 106/493; 106/31.6; 106/504; 523/160; 523/161; 366/349

(58) Field of Classification Search .......... 106/504, 106/31.6, 493; 100/45, 37; 366/349, 76.1, 366/83; 523/160, 161
See application file for complete search history.

(56) References Cited

U.S. PATENT DOCUMENTS

| | | | | |
|---|---|---|---|---|
| 1,757,808 A * | 5/1930 | Marquardt | | 101/363 |
| 2,271,324 A * | 1/1942 | Yee | | 106/259 |
| 2,404,680 A * | 7/1946 | Aneshansel | | 106/31.74 |
| 2,985,909 A | 5/1961 | Smith et al. | | |
| 3,035,306 A | 5/1962 | Rossiter | | |

(Continued)

FOREIGN PATENT DOCUMENTS

DE 915689 7/1954

(Continued)

OTHER PUBLICATIONS

Derwent Abstract of Patent Families, Dialog-Internet, Sep. 25, 2000, 27 pages.

*Primary Examiner* — Anthony J Green
*Assistant Examiner* — Pegah Parvini
(74) *Attorney, Agent, or Firm* — Harness, Dickey & Pierce, P.L.C.

(57) ABSTRACT

A method for preparing an organic pigment dispersion, such as a flush pigment or ink product, comprises steps of introducing into a twin screw extruder a stable, water-borne pigment dispersion, an organic medium, and a destabilizing agent; mixing together the stable, water-borne pigment dispersion, the organic medium, and the destabilizing agent to produce a pigment flush phase and a water phase; and removing at least a part of the water phase. A twin-screw extruder for carrying out the flushing method has an addition and flushing zone, a water removal zone, and a zone for rinsing the crude organic pigment dispersion or flush with water and removing the rinse water. Additional materials may be added to form a finished pigmented product such as an ink product, masterbatch, or toner.

26 Claims, 2 Drawing Sheets

U.S. PATENT DOCUMENTS

| | | | |
|---|---|---|---|
| 3,070,836 A | 1/1963 | De Haven et al. | |
| 3,195,178 A | 7/1965 | Carton et al. | |
| 3,235,640 A | 2/1966 | Carton et al. | |
| 3,383,096 A | 5/1968 | Braibanti et al. | |
| 3,398,113 A * | 8/1968 | Godshalk et al. | 524/197 |
| 3,622,127 A * | 11/1971 | Burke, Jr. | 366/148 |
| 3,642,507 A * | 2/1972 | Olhoft et al. | 106/169.13 |
| 3,742,093 A | 6/1973 | Skidmore | |
| 3,802,670 A | 4/1974 | Okada et al. | |
| 3,873,474 A | 3/1975 | Ficker | |
| 3,917,507 A | 11/1975 | Skidmore | |
| 3,942,767 A | 3/1976 | Hanzawa et al. | |
| 3,968,742 A | 7/1976 | Kerr | |
| 3,993,292 A | 11/1976 | Skidmore | |
| 4,054,271 A | 10/1977 | Lanzillo | |
| 4,107,126 A * | 8/1978 | Burke et al. | 523/210 |
| 4,286,008 A * | 8/1981 | Reed et al. | 428/195.1 |
| 4,300,954 A | 11/1981 | de Monterey et al. | |
| 4,309,223 A | 1/1982 | Rouwhorst et al. | |
| 4,309,320 A | 1/1982 | Arora et al. | |
| 4,366,271 A | 12/1982 | Riegler | |
| 4,431,598 A | 2/1984 | Korpman | |
| 4,443,591 A | 4/1984 | Schmidt et al. | |
| 4,446,094 A | 5/1984 | Rossiter | |
| 4,474,473 A | 10/1984 | Higuchi et al. | |
| 4,659,300 A | 4/1987 | Schwarz | |
| 4,663,103 A | 5/1987 | McCullough et al. | |
| 4,664,710 A * | 5/1987 | Gleason et al. | 106/31.6 |
| 4,722,680 A | 2/1988 | Rossberger et al. | |
| 4,729,796 A | 3/1988 | Deubel et al. | |
| 4,747,882 A | 5/1988 | Schwartz et al. | |
| 4,765,841 A * | 8/1988 | Vinther et al. | 106/402 |
| 4,776,269 A | 10/1988 | Coggins et al. | |
| 4,785,091 A * | 11/1988 | Fujita et al. | 540/144 |
| 4,789,507 A | 12/1988 | Wesley et al. | |
| 4,794,011 A | 12/1988 | Schumacher | |
| 4,794,066 A * | 12/1988 | Taggi et al. | 430/137.22 |
| 4,802,769 A | 2/1989 | Tanaka | |
| 4,830,801 A | 5/1989 | Rossberger et al. | |
| 4,910,236 A | 3/1990 | Foye et al. | |
| 4,943,402 A | 7/1990 | Kafka et al. | |
| 5,108,509 A | 4/1992 | Booth et al. | |
| 5,139,916 A * | 8/1992 | Ciccarelli | 430/137.21 |
| 5,151,026 A | 9/1992 | Andersen et al. | |
| 5,160,441 A | 11/1992 | Lundquist | |
| 5,205,930 A | 4/1993 | Obrestad | |
| 5,232,649 A | 8/1993 | Andersen et al. | |
| 5,417,854 A | 5/1995 | Day et al. | |
| 5,431,721 A | 7/1995 | Pennaz et al. | |
| 5,436,300 A | 7/1995 | Kashiwadate et al. | |
| 5,466,370 A | 11/1995 | Day et al. | |
| 5,480,541 A | 1/1996 | Day et al. | |
| 5,480,756 A | 1/1996 | Mahabadi et al. | |
| 5,489,381 A | 2/1996 | Day et al. | |
| 5,658,376 A * | 8/1997 | Noguchi et al. | 106/31.43 |
| 5,743,948 A | 4/1998 | Laszewski et al. | |
| 5,756,659 A | 5/1998 | Hughes et al. | |
| 5,758,961 A | 6/1998 | Deal et al. | |
| 5,820,667 A * | 10/1998 | Lu et al. | 106/413 |
| 6,261,677 B1 * | 7/2001 | Tsai et al. | 428/221 |
| 6,273,599 B1 | 8/2001 | Affeldt et al. | |
| 6,305,838 B1 * | 10/2001 | Affeldt et al. | 366/349 |
| 6,348,091 B1 | 2/2002 | Affeldt et al. | |
| 2003/0177939 A1* | 9/2003 | Robertson | 106/31.6 |

FOREIGN PATENT DOCUMENTS

| | | |
|---|---|---|
| DE | 2437510 A | 2/1976 |
| DE | 3248659 A1 | 5/1984 |
| DE | 4446129 A1 | 6/1995 |
| EP | 0 050 313 | 4/1982 |
| EP | 0255667 | 10/1988 |
| EP | 0 341 054 | 11/1989 |
| EP | 1 212 378 | 6/2002 |
| FR | 81735 | 1/1964 |
| GB | 1 212 346 | 11/1970 |
| GB | 1431978 | 4/1976 |
| GB | 2034628 | 6/1980 |
| GB | 2067510 | 7/1981 |
| JP | 57053568 | 3/1982 |
| JP | 551532 | 3/1993 |

* cited by examiner

PROCESSES FOR PREPARING ORGANIC PIGMENT DISPERSIONS AND INK

FIELD OF THE INVENTION

The invention relates to processes for preparing organic pigment dispersions, including pigment flushes, and pigmented compositions such as ink compositions. The present invention also relates to methods for preparing ink bases and finished ink compositions.

BACKGROUND OF THE INVENTION

Syntheses of many organic pigments include a coupling step in a dilute aqueous medium to produce a slurry of the pigment product, which is typically followed by a step of filtering the slurry in a filter press to concentrate the pigment. The press cake that results is then either dried to provide a dry, particulate pigment or else is "flushed" with an organic medium such as an oil or resin to transfer the pigment particles from the aqueous press cake to the oil or resin phase. The flushing process requires additional time and materials over simply drying the pigment. If the pigment is used in an ink or coating composition, however, it must first be well-dispersed in an appropriate organic medium in order to achieve the desired color development and stability, and thus the flushing process is advantageous because it accomplishes the transfer without intermediate steps of drying the pigment and grinding the pigment in the organic medium to produce the pigment dispersion.

In the past, pigment flushes have usually been prepared by batch processes in which the press cake is kneaded with an organic phase such as an oil or a resin, for example in a sigma blade mixer or dough mixer, to flush the pigment particles from the water phase to the organic medium phase and displace the water as a separate aqueous phase. The displaced water is decanted and the dispersion of the pigment in the varnish can be used as a pigment paste in preparing an ink or paint.

The batch process has many shortcomings. The steps of adding varnish, kneading the dough to displace the water, and pouring off the water must usually be repeated a number of times in order to obtain the maximum yield from the flusher. This is a labor-intensive process that requires careful monitoring. Further, in order to remove the residual water, the batch must be heated and stripped under vacuum. For many pigments, the heat history from processing to remove the residual water results in a color shift. Because the precise heat history may vary from batch to batch, it is difficult to reliably and accurately reproduce the same color from batch to batch. One of the most significant shortcomings of the batch process is the lot to lot fluctuations of the pigment and the solids content of the presscake. Further, the process is time-consuming and inefficient. It is difficult to reduce the water content below about 3% by weight, even with the vacuum stripping. Finally, the pigment content of presscake, and therefore of the flush can vary.

Continuous processes for preparing pigment flushes using presscake have been proposed. In particular, the processes described in U.S. Pat. Nos. 6,273,599, 6,305,838, and 6,348,091, each of which is incorporated herein by reference, have been highly successful in resolving some of the shortcomings associated with batch flushing processes. U.S. Pat. No. 5,262,268 describes using presscake to produce a toner in a twin-screw extruder.

SUMMARY OF THE INVENTION

The present invention provides a process for continuous production of organic pigment dispersion, such as pigment flush, or an ink product in which a pigment is introduced into a twin screw extruder as a stable, aqueous pigment dispersion, which can resolve the issue of lot to lot pigment/color and solids variations of presscake. A stable dispersion is one that has a usefully long shelf life without settling or becoming unpumpable. The stable pigment dispersion can be destabilized with a destabilizing agent.

In one embodiment of the invention, the stable pigment dispersion is fed at a desired rate into the extruder along with a destabilizing agent that precipitates the dispersed pigment. An organic medium, which may include organic components selected from solvent, varnish, oil, polymer, dispersant, and/or resin, is also fed into the extruder. The destabilized or precipitated pigment and organic medium are mixed in a first zone of the extruder to wet the pigment with the organic medium, displacing water from the pigment and producing an organic pigment dispersion, such as a crude pigment flush. At least a portion of the displaced water is removed in a second zone of the extruder. The second zone of the extruder includes a port for removing the displaced water, especially by draining the water, and preferably includes a dam that retains the organic pigment dispersion or pigment flush in the second zone for a time sufficient to allow most of the displaced water to be removed from the crude flush mass. A third zone has additional ports for adding rinsing water, particularly to remove salts or other by-products of the pigment destabilization or precipitation, and for draining the removing the rinsing water. The extruder may include a fourth zone that has one or more vacuum ports to draw off residual water clinging to the organic pigment dispersion or pigment flush. The extruder may have additional zones for introducing further materials for making a final pigment dispersion or ink product, such as resins, oils, solvents, dispersants, waxes, surfactants, and pigment or ink additives.

In a second embodiment, the invention also provides a method for continuous production of an ink base or a finished ink from a stable, aqueous pigment dispersion. The method includes the steps just outlined for the process of the invention for producing a pigment flush and at least one an additional step of introducing into the extruder, at some point before the discharge outlet, preferably after the optional vacuum zone, one or more additional ink components, such as a varnish, pigmented tinting or toning compositions, solvent, and/or additives, to make an ink base or a finished ink composition.

In one embodiment, the stable, aqueous pigment dispersion has a pigment content of at least about 25% by weight.

In another embodiment, the stable, aqueous pigment dispersion is stabilized by an ionic dispersant, and the destabilizing agent is an ionic agent. In one embodiment, the dispersant may have carboxylic acid groups that are salted to stabilize the aqueous dispersion, and that are destabilized with a protic or Lewis acid.

In one embodiment of the first zone, the stable pigment dispersion and destabilizing agent are introduced into the extruder at a first point or barrel. The stable pigment dispersion and destabilizing agent are mixed in the extruder to produce an aqueous destabilized pigment material The organic medium is introduced into the extruder at a second point or downstream barrel of the first zone and mixed with the destabilized pigment material to produce an organic pigment dispersion phase and a water phase.

In a second embodiment of the first zone, the stable pigment dispersion, destabilizing agent, and organic medium are all introduced into a first barrel of the extruder.

In one embodiment of the process, the aqueous, stable, pigment dispersion is substantially destabilized with the destabilizing agent before the organic medium is introduced into the extruder. In an alternative embodiment, the organic dispersion is introduced into the extruder before the aqueous, stable pigment dispersion is substantially destabilized in the extruder.

In certain embodiments of the invention, a toner product is made by using as the organic medium a toner vehicle, typically a solid polymer or resin with a low melting point.

In certain embodiments of the invention, a masterbatch is made by using as the organic medium a polymer such as polyethylene homopolymers and copolymers, acrylonitrile butadiene styrene copolymer, polybutene, polystyrene, polyphenylene oxide, polycarbonate, polypropylene, and the like optionally with a resin of low melt viscosity such as a hydrocarbon, terpene, or rosin material.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

DETAILED DESCRIPTION OF THE PREFERRED EMBODIMENTS

The following description of the preferred embodiment(s) is merely exemplary in nature and is in no way intended to limit the invention, its application, or uses.

The inventive method for continuous production of organic pigment dispersions, pigment flush, or an ink product or other pigmented product employs a stable, water-borne pigment dispersion that is introduced into a twin screw extruder and destabilized in the extruder. The destabilized or precipitated pigment is mixed or flushed with an organic medium. The separate water phase may then be removed from the organic pigment dispersion phase.

One example of a preferred extruder configuration has at least four zones, and optionally has a fifth zone or further zones. In a first zone, represented in the FIG. 1 by barrels 1 through 3, the stable, aqueous pigment dispersion, organic medium, and destabilizing agent are fed into the extruder (barrel 1) and then mixed to destabilize or precipitate the pigment and flush or remove the pigment from the aqueous phase to the organic phase (barrels 2 and 3). The destabilizing agent is fed in separately from, and preferably after, the pigment dispersion. In a second zone, represented by barrels 4 and 5, at least a portion of the water displaced during the flushing stage in the first zone is removed by draining or drawing the liquid from the extruder. In a third zone, represented by the end of barrel 5 and barrels 6, 7A, 8, and 7, rinse water may be introduced to rinse any impurity, such as a salt precipitated by interaction of the destabilizing agent and a salted dispersant resin of the aqueous pigment dispersion, from the organic pigment dispersion or pigment flush mixture, the rinse water being removed by draining or drawing the liquid from the extruder through a port. In a fourth zone, represented by sections 9 through 11, residual water may be removed (as water vapor) by vacuum dehydrating the organic pigment dispersion or pigment flush through vacuum ports. The fourth zone may also have ports for introducing additives, resins, and so as desired for the organic pigment dispersion, flush product, or ink or other pigmented product. In a fifth, optional zone, represented by sections 12 through 14, the organic pigment dispersion or flush is further mixed and other components may be added to the pigment dispersion or flush, as in the fourth zone. Further ports may be used to introduce ink components or other desired materials in the fourth zone and/or optional fifth zone to produce an ink base, finished ink composition, or other pigment product. Each zone may be heat or cooled to a desired temperature for optimum mixing and preservation of the pigment color properties. The product may be cooled before discharging.

Figure 1:
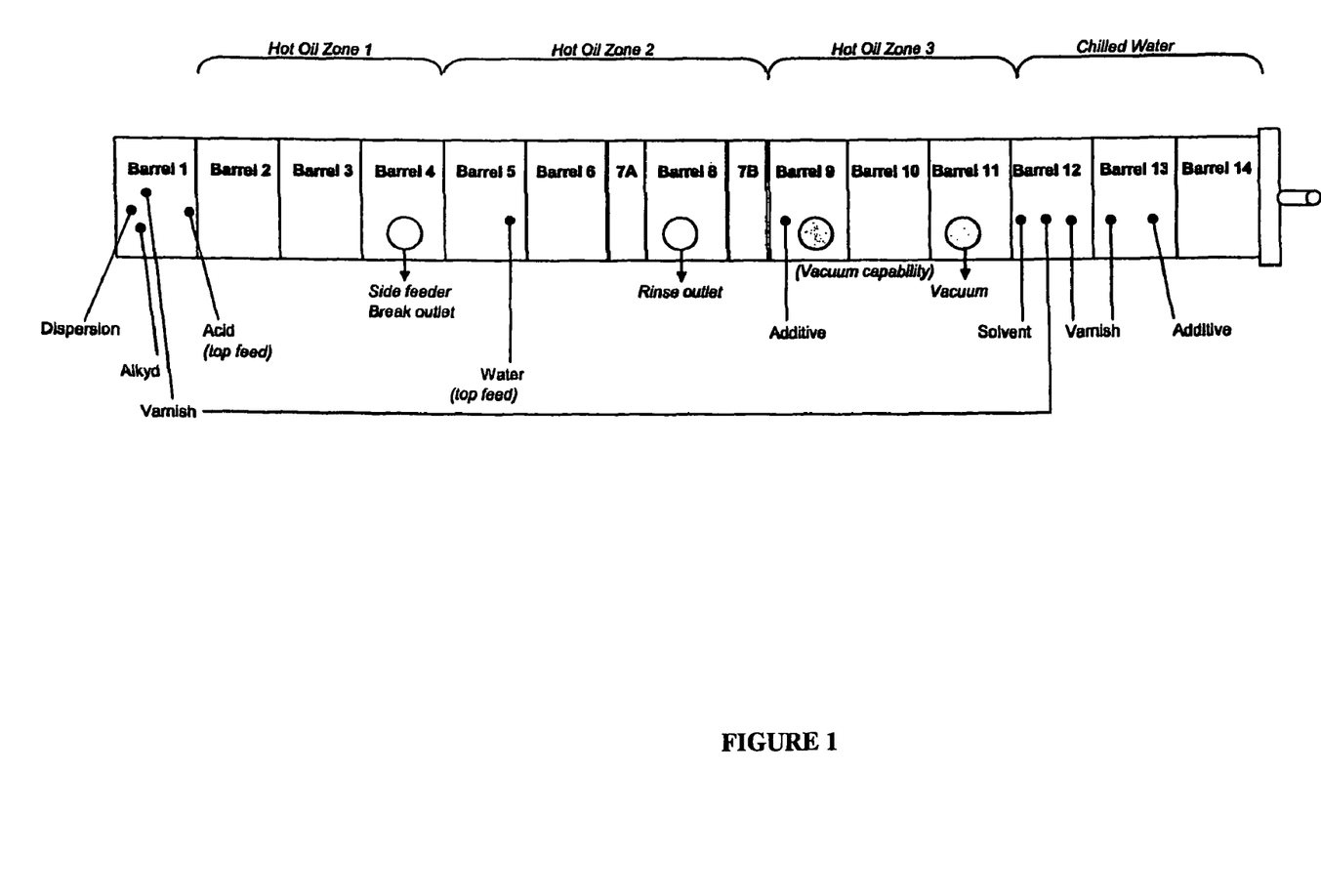
FIG. 1 is a schematic diagram of one extruder configuration for carrying out an embodiment of the inventive process.
Figure 2:
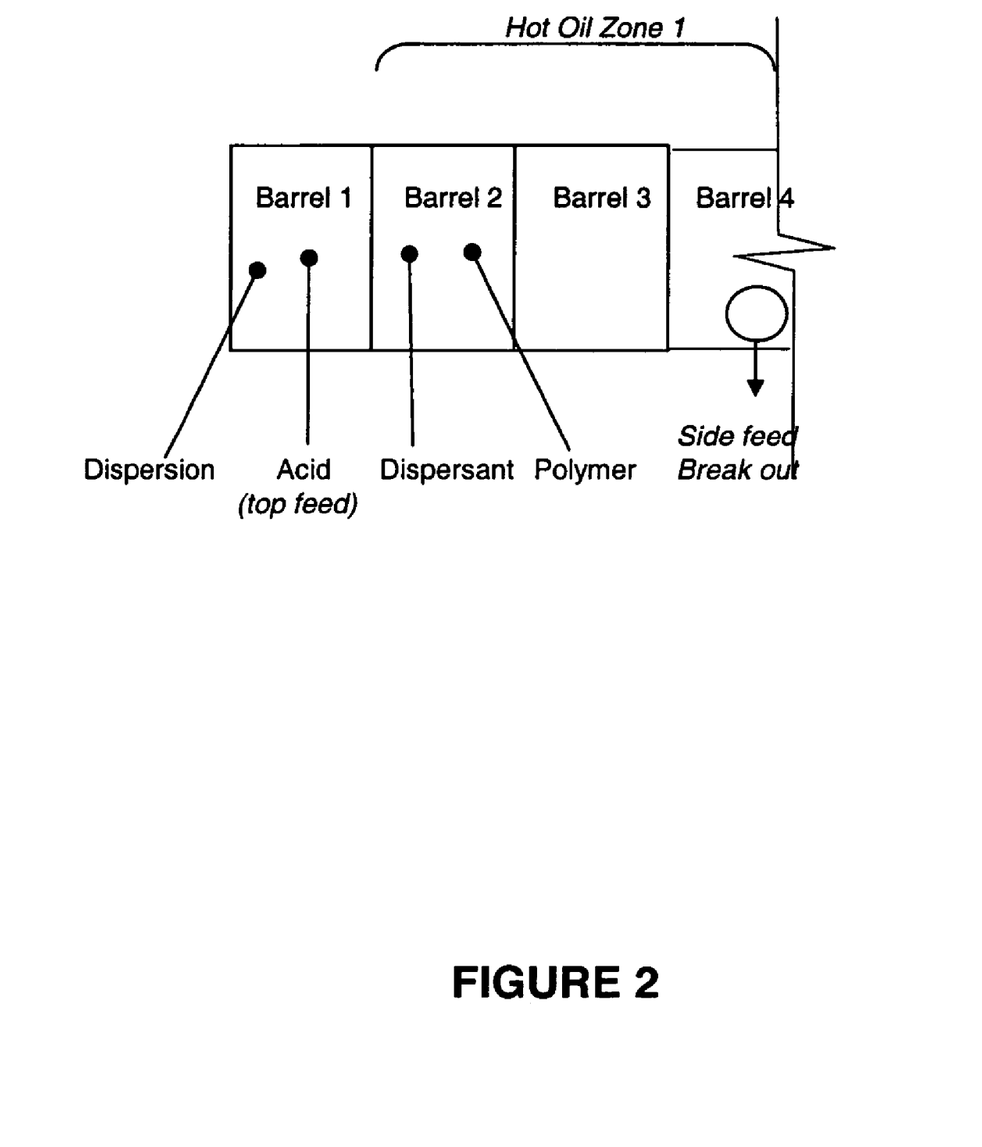
FIG. 2 is a schematic diagram of an alternative configuration for the first four barrels of the extruder of FIG. 1.

FIG. 2 illustrates an alternative example of a first zone of the extruder of FIG. 1. In the alternative embodiment, the stable, aqueous pigment dispersion and destabilizing agent are introduced and mixed in barrel 1. Organic medium, shown in FIG. 2 as polymer and dispersant, is introduced in barrel 2. The pigment is destabilized or precipitated in barrel 1, and may form a thick, presscake-like material. The destabilized pigment is then mixed with organic medium in barrels 2 and 3 to incorporate the pigment into the organic medium, forming an organic pigment dispersion and displacing a water phase. Processing of the organic pigment dispersion continues through the second, third, optional fourth, and optional fifth zones as before.

In a first step of a first-embodiment of the method, a stable, water-based pigment dispersion, organic medium, and destabilizing agent are introduced into a first zone of the extruder. A stable, water-based pigment dispersion may be prepared in any of a number of known methods. The pigment used to make the stable, water-borne pigment dispersion may be, for example, in the form of an aqueous slurry, a presscake, a dry crude pigment or activated crude pigment, or a dry pigment. The pigment is stabilized in the aqueous dispersion with a polymeric, oligomeric, and/or monomeric dispersant or combination of dispersants. The dispersant(s), base for salting the dispersant(s), and water (as needed) are combined with the pigment to form a stable, water-borne pigment dispersion of a desired pigment content.

Any of a number of organic pigments may be used to form the stable dispersion. Suitable examples include, without limitation, azo pigments such as lithol reds (e.g., calcium lithol red, barium lithol red), rubine reds, and naphthol reds, oranges, and browns; monoarylide and diarylide pigments such as diarylide yellow, phthalocyanine blue and green pigments, azomethine pigments, methine pigments, anthraquinone pigments, perinone pigments, perylene pigments, diketopyrrolopyrrole pigments, thioindigo pigments, iminoisoindoline pigments, iminoisoindolinone pigments, quinacridone pigments such as quinacridone reds and violets, flavanthrone pigments, indanthrone pigments, anthrapyrimidine pigments, carbazole pigments such as carbazole violet, benzimidazolone yellows, tolyl orange, naphthol orange, and quinophthalone pigments and so on.

Examples of useful ionic dispersants that may be used in producing the stable, aqueous pigment dispersions include, without limitation, fatty acids (e.g., lauroyl acid, tall oil fatty acid, oleic acid, linoleic acid, linolenic acid, palmitic acid, stearic acid, and oleic acid); alkylbenzenesulfonates; alkyl sulfates such as dioctylsulfosuccinates; ionic resins such as alkyd resins, polyesters, rosins and modified rosins such as unsaturated acid- (e.g., maleic-, fumaric-, acrylic-, methacrylic-, crotonic-) modified rosins, dimerized rosins, disproportionated rosins, hydrogenated rosins, phenolic-modified rosins, other maleic- or fumaric-modified polymers, acid-functional vinyl resins including acid-functional acrylic polymers, phenolic-acrylic polymers, and styrene-maleic anhydride (SMA) copolymers, low molecular weight, acid-functional polyurethanes, and other stabilizing materials used or useful for preparing dispersions that are pH sensitive or that may be destabilized in the extruder by another material. The dispersants may be used in any stable combination. The ionic resins are salted with a suitable counterion to provide water solubility or dispersibility. Acid-functional dispersants may be salted with bases, e.g., sodium hydroxide, ammonium hydroxide, potassium hydroxide, and mono- and dialkyl amines. The water-based dispersions may also include other additives useful for making organic pigment compositions or flush color such as oils (vegetable and petroleum), antioxidants, defoamers, surfactants, so-called pigment or hyperpigment dispersants, and non-dispersant resins.

The stable, water-based pigment dispersions are preferably at least about 25% by weight pigment, more preferably at least about 35% by weight pigment. The pigment content of the stable dispersion depends on both the pigment and dispersant selected, and may exceed 50% by weight, or even 60% by weight, and still be water-thin. The organic pigment dispersions typically have a pigment content by weight of from about 25% to about 50% by weight. The stable, water-based pigment dispersions may contain from 6 to about 40 parts by weight of ionic dispersant per 100 parts by weight of pigment.

The stable, water-based pigment dispersion may be prepared as an extension of the pigment synthesis, by treatment of a pigment slurry, or by post-dispersion of a presscake or dry pigment, e.g. in high-speed dispersers, rotor-stators, basket mills, or pigment grinding mills.

The organic medium into which the pigment is to be dispersed or flushed is sufficiently hydrophobic to allow a non-aqueous phase to form in the process. Types of organic materials that are suitable to prepare pigment flushes are well-known in the art. The organic medium may be fed through the same port as the stable, water-borne pigment dispersion, but it is preferably fed into the extruder through a separate port. The organic medium can include organic materials used as vehicles for ink or for toner.

Typical kinds of resins and oils that may be used for flushing varnishes include, without limitation, alkyd resins, phenolic resins, polyesters, hydrocarbon resins, maleic resins, rosin-modified varnishes of any of these, polyamide resins, polyvinyl chloride resins, vinyl acetate resins, vinyl chloride/vinyl acetate copolymer resins, chlorinated polyolefins, polystyrene resins, acrylic resins, polyurethane resins, ketone resins, vegetable oils including linseed oil, soybean oil, neatsfoot oil, coconut oil, tung oil, mineral oils, and so on. Combinations of such resins and oils may also be employed. The resin, oil, or combination thereof may be combined with a hydrophobic organic solvent or liquid, including high boiling petroleum distillates.

Typical kinds of organic materials that may be used to form organic pigment dispersions for toners include but are not limited to polyamides, epoxies, diolefins, polyurethanes, vinyl resins and polymeric esterification products of a dicarboxylic acid and a diol comprising a diphenol. Among suitable vinyl resins are those having as monomeric units styrene, p-chlorostyrene, vinyl naphthalene, ethylene, propylene, butylene, and isobutylene, vinyl chloride, vinyl bromide, vinyl fluoride, vinyl acetate, vinyl propionate, vinyl benzoate, vinyl butyrate, methyl acrylate, dodecyl acrylate, n-octyl acrylate, 2-chloroethyl acrylate, phenyl acrylate, methylalphachloroacrylate, methyl methacrylate, ethyl methacrylate, butyl methacrylate, acrylonitrile, methacrylonitrile, acrylimide, vinyl methyl ether, vinyl isobutyl ether, vinyl ethyl ether, vinyl methyl ketone, vinyl hexyl ketone, methyl isopropenyl ketone, vinylidene chloride, vinylidene chlorofluoride, N-vinyl indole, and N-vinyl pyrrolidone, as well as styrene butadiene copolymers, Typical kinds of organic materials that may be used to make masterbatches include, without limitation, polymers such as polyethylene homopolymers and copolymers, polypropylene homopolymers and copolymers, acrylonitrile butadiene styrene copolymer, polystyrene, polyphenylene oxide, polycarbonate, polyacrylate, and the like. These polymers may be used in conjunction with a low molecular weight resin such as a hydrocarbon resin, rosin, or terpene resin.

In the first embodiment, the stable, water-based pigment dispersion is fed into a first zone of the extruder, along with the organic medium and a separate feed of a destabilizing agent. The aqueous pigment dispersion, precipitating agent, and organic medium can be added at controlled, consistent rates for production of consistent flush product. For example, they may each be fed from a line or tank, which may have a stirrer, and may be metered in with, for example, a pump.

Preferably, the organic medium, stable, water-borne pigment dispersion, and destabilizing agent are each introduced at fairly constant rates. The relative amounts of the organic medium and the pigment of the water-based pigment dispersion for optimum processing can be determined based upon the particular materials chosen, but in general the amounts remain the same as those expected for conventional batch flushing processes. For example, the amount of organic medium introduced per unit of time may be from about 0.6 to about 3 times the amount of solid pigment introduced in the same unit of time. The ratio of organic medium to solid pigment may be adjusted according to factors known in the art, such as the type of pigment and the type of organic medium and may be controlled by the automated process controls.

The water-based pigment dispersion is destabilized, and the pigment is released or precipitated, by the addition of the destabilizing agent. The destabilizing agent is selected based on the nature of the stabilization of the pigment dispersion. For example, when the pigment dispersion is prepared using pH-sensitive dispersant, for example a salted, anionic resin, a destabilizing agent that alters the pH, for example to acidic pH, is effective. Typical kinds of destabilizing agent that may be added include protic acids and Lewis acids such as hydrochloric acid, sulfuric acid, phosophoric acid, phosphonic acid, acetic acid, formic acid, and aluminum chloride. These destabilizing agents may be added in combination, and other, weaker acids (e.g., calcium chloride, strontium chloride) may be added in combination with stronger acids. The destabilizing agent is preferably chosen so that any excess destabilizing agent and any salts produced by the interaction of the destabilizing agent with the water-borne pigment dispersant can be removed by washing or by evaporation.

In a second embodiment of the invention, the stable, water-based pigment dispersion and separate feed of destabilizing agent are introduced into the extruder, mixed, and then, at a downstream point, the organic medium is added In this embodiment, the water-based pigment dispersion is first substantially destabilized with the destabilizing agent before the organic medium is added. The destabilized aqueous pigment dispersion may have a high viscosity that is advantageous for mixing with a high viscosity polymer melt, such as may be used in making a masterbatch.

A twin-screw extruder used in a preferred embodiment of the method is shown in FIG. 1. The first zone comprises screw elements for mixing the destabilized, aqueous pigment and the organic medium. The destabilized, aqueous pigment is thought to be like a high solids presscake in the extruder, and the first zone should include one or more elements for high shear mixing. Referring again to the FIG. 1, Barrel 1 has four separate ports for introduction (in preferred order) of stable, aqueous pigment dispersion, an alkyd, a varnish, and an acidic destabilizing agent. Barrel 1 contains feed screw elements. Barrel 2 contains combined mixing or kneading screw and conveying screw elements. Barrel 3 contains combined high shearing mixing and conveying screw elements. Barrels 2 through 4 may be heated with an oil jacket held at about 60° C. The pigment mixture in barrel 2 may be about 45° C., but may reach almost 90° C. due to heat generated by the flushing shear.

In an alternative embodiment shown in FIG. 2, Barrel 1 has two separate parts for introduction of stable, aqueous pigment dispersion and destabilizing agent, while Barrel 2 has two separate ports for introduction of a polymer and a dispersant. Optionally, a further barrel may be introduced before Barrel 4 for longer mixing before separation of the aqueous phase.

In one preferred embodiment of the invention, the screw profile in the first zone tapers from a deep channel used in the section or sections having a feeding port gradually to a shallow channel in a later (downstream) section or section of the first zone. The length of the first zone of the extruder in which the destabilized aqueous pigment and the organic medium are mixed is sufficiently long so that the pigment is flushed completely. The rotational speed of the screw also is a factor for efficient flushing. A preferred range for rotational speed of the screw is from about 150 to about 550 rpm, and a more preferred range for rotational speed is from about 250 to about 350 rpm. Because of the high pigment concentration, the flushing zone of the extruder may be relatively short as compared to a flushing zone needed for lower aqueous pigment concentrations.

The displaced water and the crude organic pigment dispersion or pigment flush continue in the extruder to a second zone of the extruder where at least a portion of the displaced water is removed. Preferably a major portion of the displaced water is removed in the second zone, more preferably at least about 80%, still more preferably at least about 90%, and even more preferably all but a residual amount of water that clings to the pigment flush is removed. Referring to the FIG. 1, barrel 4 includes an outlet for removing water displaced in the flushing zone, preferably by draining the water off. While the water may be withdrawn by other means, gravity draining is the simplest and is, therefore, preferred. The outlet or port may contain a separate length of screw turned by a motor that drives the relatively viscous pigment-containing flush back into the barrel section while letting the water drain out, as describe in U.S. Pat. Nos. 6,273,599, 6,305,838, and 6,348,091.

The second zone preferably has a dam downstream of the water drain or outlet that retains the organic pigment dispersion or pigment flush for a time sufficient to allow most of the displaced water to drain from the crude organic pigment dispersion or flush mass. The dam causes the kneaded pigment/organic medium to dwell over the port long enough to allow more of the displaced water to drain from the kneaded pigment. A portion of the mixture of pigment and organic medium is carried into the dammed section of the extruder and remains in that section until the portion works its way out of the pocket of retained material and is carried into the next section by the grabbing action of the screw. Such dam is described in more detail in U.S. Pat. Nos. 6,273,599, 6,305,838, and 6,348,091. In brief, at least one screw element downstream of the outlet, in barrel 5 of FIG. 1, is reverse-threaded in a tight thread to provide sufficient reverse flow to cause the material to fill the area having the outlet. The reverse flow force that causes the damming effect is limited so that there is no squeezing, as squeezing would tend to produce an emulsion of the aqueous and organic phases, impairing the desired separation of water from organic phase. The effect of the reverse flow is to cause material to accumulate before eventually flowing over the created dam and/or being pulled on by forward-turning screws located further downstream. The water is not engaged by the forward screws and does not flow over the accumulated material. Instead, the water is held in the second zone to drain. Because more of the water is drained from the flush in a liquid phase instead of being evaporated, as compared to prior methods, the final product contains a lower concentration of salts. The dam thus improves the purity of the product.

It is preferred, as illustrated in FIG. 1, to introduce rinse water into the crude flush in a third zone to rinse any water miscible or soluble impurities, particularly any salt precipitated by interaction of the destabilizing agent and a salted dispersant resin of the aqueous pigment dispersion, from the pigment dispersion or flush mixture that may be retained in the crude dispersion or flush. The rinse water may also, of course, remove impurities that were contained in the water-based pigment dispersion; thus, the water-based pigment dispersion can have a high or low impurity or salt content that can be washed out in the extruder. Typically, the water may be added at a rate of 60 to 150% of that of the pigment addition rate to the extruder. The rinse water (preferably introduced through a port in the top of the extruder) may be mixed with the crude flush product in one or more barrels of the third zone and then be removed by draining or drawing the liquid from the extruder through a port, as in the second zone. Again, as in the second zone, it is preferred to create a dam by introducing reverse-threaded (or left-hand) screw elements downstream from the port or drain. If both a second and third zone are described, then at least the third zone should include such a dam to minimize the residual water in the organic pigment dispersion or flush product that exits the third zone. In one preferred embodiment of the invention, the screw profile in the third zone tapers from a deep channel used in the section or sections having a feeding port gradually to a shallow channel in a later (downstream) section or section of the third zone. The length of the third zone of the extruder in which the preflushed pigment and wash are mixed is sufficiently long to remove undesirable water immiscible impurities from the pigment.

In FIG. 1, a third zone begins with a inlet port at the end of barrel 5 for adding rinse water. Barrels 6 and 7A contain mixing and conveying screw elements, and Barrel 8 contains mixing elements and the rinse water outlet, preferably configured as the outlet described for barrel 4. One or more of the mixing elements may include a plurality of kneading disks. Barrel 7B may contain the reverse-threaded screw element or elements. Barrels 5 through 8 may be jacketed with an oil jacket held at about 60° C. The pigment mixture in barrel 5 may be about 80° C. or higher, and may reach about as high as 120° C. in barrel 7.

In FIG. 1, a fourth zone is shown by barrels 9-11, which include conveying screw elements and two vacuum ports for removing residual water as water vapor. This zone is optional but preferred, and includes one or more vacuum ports to draw off residual water clinging to the pigment flush. The water is drawn off as water vapor. Suitable vacuum ports are known to be used with extruders and typically can include a section containing a screw turned by a motor in the vacuum port to help retain the flush in the extruder, as described in U.S. Pat. Nos. 6,273,599, 6,305,838, and 6,348,091. A vacuum pump is typically connected to the vacuum port to provide the reduced pressure. The profile of the screw used for the vacuum section preferably has a shallow channel, which tends to increase the efficiency of vacuum dehydration by shaping the material in a thin layer form. FIG. 1 shows identical vacuum ports on consecutive extruder sections. Barrels 9 through 11 may be jacketed with a hot oil jacket held at about 40° C. The evaporation and lower jacket temperature should be expected to cool the material in the extruder; in barrel 9 it may be about 70° C. or higher, and by barrel 11 it may be as high as about 90° C.

Barrel 9 in FIG. 1 shows an inlet, by which a desired additive, resin, solvent, or other material may be added to obtain the desired flush or ink product composition, toner, masterbatch, or other pigmented composition. Likewise, barrels 12 and 13 illustrate ports for addition of solvent, varnish, additive, as shown, and/or other materials desired in the composition of the final flush, ink product, toner, masterbatch, or other pigmented composition. Barrels 12 to 14 are shown with a chilled water jacket for cooling the product before discharge. The cooling water jacket may be 35-40° C., so that the product exiting the extruder may be at 65° C. or lower. This last zone of the extruder may be as long or short as need to introduce the desired materials, with effective mixing, and to cool the product.

The process of the invention produces more consistent product with less need for adjustment of parameters during the flush process.

The pigment flush produced by the inventive process may be used to prepare an ink composition according to usual methods. Alternatively, the pigment flush may be made into an ink base or a finished ink composition in the continuous process of the invention by introducing additional materials such as varnish, other resins, organic solvent and/or additives into the extruder at some point before the pigment flush is discharged, preferably after the vacuum zone. The flushed pigment dispersion and other ink component(s) are combined in the extruder so that the output from the extruder is an ink base or ink composition. Typical resins used as ink varnishes that may be added include, without limitation, alkyd resins, polyesters, phenolic resins, rosins, cellulosics, and derivatives of these such as rosin-modified phenolics, phenolic-modified rosins, hydrocarbon-modified rosins, maleic modified rosin, fumaric modified rosins; hydrocarbon resins, vinyl resins including acrylic resins, polyvinyl chloride resins, vinyl acetate resins, polystyrene, and copolymers thereof; polyurethanes, polyamide resins, and so on. Combinations of such resins may also be employed. Suitable example of organic solvents that may be added include, without limitation, aliphatic hydrocarbons such as petroleum distillate fractions and normal and isoparaffinic solvents with limited aromatic character. Any of the many additives known in the art that may be included in the ink compositions of the invention, so long as such additives do not significantly detract from the benefits of the present invention. Illustrative examples of these include, without limitation, pour point depressants, surfactants, wetting agents, waxes, emulsifying agents and dispersing agents, defoamers, antioxidants, UV absorbers, dryers (e.g., for formulations containing vegetable oils), flow agents and other rheology modifiers, gloss enhancers, and anti-settling agents. When included, additives are typically included in amounts of at least about 0.001% of the ink composition, and the additives may be included in amounts of up to about 7% by weight or more of the ink composition.

The toner produced by the process may have additional materials such as silica, dispersants, charge control additives, stabilizers, waxes, and so on added, preferably after the vacuum zone.

The masterbatch produced by the process may likewise have additional materials added, again preferably after the vacuum zone. Examples of such additional materials include, without limitation, stabilizers, slip additives and lubricants, nucleators, antioxidants, biocides, UV absorbers, hindered amine stabilizers, antisatic agents, fillers, tackifying resins, and so on.

In one important aspect of the invention, the extruder further includes at least one monitoring apparatus that continually monitors a property of the material being processed in the extruder. The apparatus measures the property of the material and compares the value measured to a desired value for the property. The apparatus then uses the comparison to adjust one or more parameters of the process.

The monitoring apparatus keeps the product of the extruder usable. In this regard, because of the many properties and parameters involved in producing the organic pigment dispersions, pigment flush, or ink product or other pigment product in a continuous process instead of in the batch processes previously used, apparatuses that provide continuing monitoring of properties of the material during the processing with automated or semi-automated adjustment of processing parameters are important in order to avoid producing large amounts of unusable off-specification material. The choice of adjustment is preferably made according to predetermined logic and is made and applied to the process by a computer processing unit or "programmable logic controller." Suitable microprocessors that can be so programmed are known and need not be described further here.

The monitoring apparatus may include one or more measuring devices selected from spectrophotometers, viscometers, thermocouples, pH meters, turbidity meters, conductivity meters, moisture content meters, particle size analyzers, and combinations of these. The monitoring apparatus may also include one or more control devices for the extruder selected from mass flow meters, motor amp meters, devices that control the motor speed and/or the screw rotation speed, devices that control the rate of feed of one or more feed components, devices that begin or stop feed from auxiliary feed components, devices that control the amount of vacuum applied, devices that control the processing temperature at a point in the process, and combinations of these. The monitoring apparatus may be located at any point along the extruder at an outlet or in a sample loop. The monitoring apparatus is preferably located at the exit of the extruder. The monitoring apparatus may include a diverter to isolate out-of-specification material from the product stream until the value of the measured property is again acceptable.

Further details about preferred monitoring apparatus types and their use may be found in U.S. Pat. No. 6,348,091. It is preferred to use such instruments to monitor one or more properties in the present process.

The invention is illustrated by the following examples. The examples are merely illustrative and do not in any way limit the scope of the invention as described and claimed. All parts are parts by weight unless otherwise noted.

Example of the Invention

A twin screw co-rotating extruder with a screw diameter of 44 mm, L/D of 56, and a speed of 450 rpm is used to produce a pigment flush. The table below summarizes the addition points, rates and temperatures for an extruder as depicted in the FIGURE.

|  | Barrels | | | | | | | | |
| --- | --- | --- | --- | --- | --- | --- | --- | --- | --- |
|  | 1 | 2-3 | 4 | 5 | 6-7 | 8 | 9-11 | 12-13 | 14 |
| Function | add | mixing, break | discharge | add | mixing | discharge | vacuum dehydration | add | mixing |
| Feed | Waterborne pigment dispersion, alkyd, varnish, acid | — | — | rinse water | — | — | — | solvent, varnish, additives | — |
| Jacket | none | heat | heat | heat | heat | heat | heat | — | cool |
| Temperature | — | — | — | 93° C. | — | 96° C. | 80° C. | — | 60° C. |

A 44% by weight solids, water-based, blue dispersion is fed into the first barrel of an extruder as shown in the FIGURE at a rate of 117 lbs./hr along with 56% acetic acid at a feed rate of 7.0 lbs./hr., an alkyd and an organic vehicle at a feed rate of 12 lbs/hr., and a first hydrocarbon varnish at a feed rate of 19.7 lbs./hr. This mass is then mixed through the end of barrel 3. The displaced water is drained from the pigment/varnish mass in barrel 4. The water should be fairly clear. Water is then charged to the extruder at Barrel 5 at a flow rate of 80 lbs./hr. The crude flush product and water are mixed in barrels 6 and 7A, and the water is drained from the extruder in barrel 8. Barrels 9 to 11 comprise a vacuum dehydration zone in which further, residual water is removed from the flush product at barrels 9 and 11.

The flush is reduced by addition of 9.4 lbs/hr of a hydrocarbon varnish and 8.8 lbs/hr of a hydrocarbon oil in Barrels 12 and 13. The pigment flush is allowed to cool. The pigment flush, hydrocarbon varnish and hydrocarbon oil are further mixed and cooled in Section 14. The resulting product is a shade converted flush with less than 2% water content.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for preparing a flush pigment or ink product, comprising steps of introducing into a twin screw extruder a stable, water-borne pigment dispersion, an organic medium, and a destabilizing agent, wherein the stable, water-borne pigment dispersion has a pigment content of at least about 25% by weight;
   mixing together the stable, water-borne pigment dispersion, the organic medium, and the destabilizing agent to produce a pigment flush phase and a water phase; and
   removing at least a part of the water phase from the twin screw extruder.

2. A method according to claim 1, wherein the organic medium comprises a member selected from the group consisting of organic solvents, varnishes, oils, resins, and combinations thereof.

3. A method according to claim 1, further comprising a step of adding one or more ink components selected from the group consisting of varnishes, pigmented tinting and toning compositions, organic solvents, ink additives, and combinations thereof.

4. A method according to claim 1, wherein the stable, water-borne pigment dispersion is stabilized by an ionic dispersant, and the destabilizing agent is an ionic agent.

5. A method according to claim 4, wherein the ionic dispersant has salted carboxylic acid groups and the destabilizing agent is selected from the group consisting of protic acids and Lewis acids.

6. A method for preparing an organic pigment dispersion or pigmented product, comprising steps of
   introducing into a twin screw extruder a stable, waterborne pigment dispersion, and a destabilizing agent, wherein the stable, water-borne pigment dispersion has a pigment content of at least about 25% by weight;
   mixing together the stable, water-borne pigment dispersion and the destabilizing agent to produce a substantially destabilized pigment;
   introducing into the twin screw extruder an organic medium;
   mixing together the substantially destabilized pigment and the organic medium to produce an organic pigment dispersion phase and a water phase; and
   removing at least a part of the water phase from the twin screw extruder.

7. A method according to claim 6, wherein the organic medium comprises an ink vehicle material.

8. A method according to claim 6, wherein the organic medium comprises a toner vehicle material.

9. A method according to claim 6, wherein the organic medium comprises at least one of polyethylene homopolymers and copolymers, acrylonitrile butadiene styrene copolymers, polybutenes, polystyrenes, polyphenylene oxides, polycarbonates, polypropylenes, hydrocarbon resins, terpene resins, and rosin materials.

10. A method according to claim 6, wherein the organic medium comprises a polymer and a dispersant.

11. A method according to claim 6, wherein the organic medium comprises at least one of polyamides, epoxies, diolefins, polyurethanes, vinyl resins, and polymeric esterification products of dicarboxylic acids and diol comprising a diphenol.

12. A method according to claim 6, further comprising, after removing the water phase, adding into the extruder at least one of silica, dispersants, charge control additives, stabilizers, waxes, slip additives, lubricants, nucleators, antioxidants, biocides, UV absorbers, hindered amine light stabilizers, antistatic agents, fillers, and tackifying resins.

13. A method according to claim 6, wherein the stable, water-borne pigment dispersion is stabilized by an ionic dispersant, and the destabilizing agent is an ionic agent.

14. A method according to claim 13, wherein the ionic dispersant has salted carboxylic acid groups and the destabilizing agent is selected from the group consisting of protic acids and Lewis acids.

15. A method for preparing a flush pigment or ink product, comprising steps of introducing into a twin screw extruder a stable, water-borne pigment dispersion, an organic medium, and a destabilizing agent, wherein the stable, water-borne pigment dispersion is stabilized by an ionic dispersant, and the destabilizing agent is an ionic agent;
   mixing together the stable, water-borne pigment dispersion, the organic medium, and the destabilizing agent to produce a pigment flush phase and a water phase; and
removing at least a part of the water phase from the twin screw extruder.

16. A method according to claim 15, wherein the organic medium comprises a member selected from the group consisting of organic solvents, varnishes, oils, resins, and combinations thereof.

17. A method according to claim 15, further comprising a step of adding one or more ink components selected from the group consisting of varnishes, pigmented tinting and toning compositions, organic solvents, ink additives, and combinations thereof.

18. A method according to claim 15, wherein the ionic dispersant has salted carboxylic acid groups and the destabilizing agent is selected from the group consisting of protic acids and Lewis acids.

19. A method for preparing an organic pigment dispersion or pigmented product, comprising steps of
introducing into a twin screw extruder a stable, water-borne pigment dispersion, and a destabilizing agent, wherein the stable, water-borne pigment dispersion is stabilized by an ionic dispersant, and the destabilizing agent is an ionic agent;
mixing together the stable, water-borne pigment dispersion and the destabilizing agent to produce a substantially destabilized pigment;
introducing into the twin screw extruder an organic medium;
mixing together the substantially destabilized pigment and the organic medium to produce an organic pigment dispersion phase and a water phase; and
removing at least a part of the water phase from the twin screw extruder.

20. A method according to claim 19, wherein the organic medium comprises an ink vehicle material.

21. A method according to claim 19, wherein the organic medium comprises a toner vehicle material.

22. A method according to claim 19, wherein the organic medium comprises at least one of polyethylene homopolymers and copolymers, acrylonitrile butadiene styrene copolymers, polybutenes, polystyrenes, polyphenylene oxides, polycarbonates, polypropylenes, hydrocarbon resins, terpene resins, and rosin materials.

23. A method according to claim 19, wherein the organic medium comprises a polymer and a dispersant.

24. A method according to claim 19, wherein the organic medium comprises at least one of polyamides, epoxies, diolefins, polyurethanes, vinyl resins, and polymeric esterification products of dicarboxylic acids and diol comprising a diphenol.

25. A method according to claim 19, further comprising, after removing the water phase, adding into the extruder at least one of silica, dispersants, charge control additives, stabilizers, waxes, slip additives, lubricants, nucleators, antioxidants, biocides, UV absorbers, hindered amine light stabilizers, antistatic agents, fillers, and tackifying resins.

26. A method according to claim 19, wherein the ionic dispersant has salted carboxylic acid groups and the destabilizing agent is selected from the group consisting of protic acids and Lewis acids.

* * * * *